United States Patent [19]

Morita et al.

[11] Patent Number: 5,292,439
[45] Date of Patent: Mar. 8, 1994

[54] METHOD FOR PREPARING ULTRAPURE WATER

[75] Inventors: Takamitsu Morita, Yokohama; Junya Watanabe, Tokyo; Toyokazu Sugawara, Sagamihara, all of Japan

[73] Assignee: Mitsubishi Kasei Corporation, Tokyo, Japan

[21] Appl. No.: 796,389

[22] Filed: Nov. 22, 1991

[30] Foreign Application Priority Data

Nov. 22, 1990 [JP] Japan .................. 2-318286

[51] Int. Cl.$^5$ .............................................. C02F 1/42
[52] U.S. Cl. ...................... 210/638; 210/664; 210/669; 210/686; 210/900
[58] Field of Search ............... 210/686, 900, 638, 664, 210/669, 683, 748

[56] References Cited

U.S. PATENT DOCUMENTS

| | | | |
|---|---|---|---|
| 3,276,458 | 10/1966 | Iversen et al. | 210/900 |
| 3,870,033 | 3/1975 | Faylor et al. | 210/900 |
| 4,430,226 | 2/1984 | Hegde et al. | 210/686 |
| 4,548,716 | 10/1985 | Boeve | 210/900 |

*Primary Examiner*—Ivars Cintins
*Attorney, Agent, or Firm*—Oblon, Spivak, McClelland, Maier & Neustadt

[57] ABSTRACT

A method for preparing an ultrapure water, from which impurities including inorganic salts, organic substances, fine particles and microorganisms are removed, by treatment including an ion exchange treatment, which comprises using an ion exchange resin comprising a copolymer of a polyvinyl compound and a monovinyl aromatic compound which may contain a monovinyl aliphatic compound, as the matrix, at least in a mixed bed ion exchange treatment of the ion exchange treatment, said ion exchange resin used comprising at least a regenerated form ion exchange resin A eluting an organic compound of a molecular weight of less than 3,000 but substantially not eluting an organic compound of a molecular weight of not less than 3,000 when dipped in a hot water at 50° C. for 7 days.

49 Claims, 7 Drawing Sheets

FIGURE 1

Molecular weight distribution of eluate of Sample B

METHOD FOR PREPARING ULTRAPURE WATER

BACKGROUND OF THE INVENTION

1. Field of the Invention

The present invention relates to a method for preparing a pure water. Particularly, the present invention relates to a method for preparing a pure water of a very high purity, so to speak an ultrapure water, suitable for use in electronic industries, for example, as a cleaning water used in the preparation of ultra LSI.

2. Discussion of Background

There are known many methods for preparing a pure water. For instance, a typical method comprises subjecting a basic water to be cleaned to direct filtration to remove suspended substances and treating the resultant water with an ion exchange resin to remove the majority of ionic substances present therein, thus producing a deionized water. The deionized water is then subjected to an ultraviolet ray irradiation step for decomposing organic substances present therein, a step for removing dissolved gases under reduced pressure, a step for removing dissolved ionic substances with a mixture system of a strong acidic cation exchange resin and a strong basic anion exchange resin, a step for removing dissolved substances by a reverse osmosis membrane and the like, thereby producing a pure water. The pure water thus obtained has water qualities preferably of a specific resistance of at least 18MΩ·cm and a total organic carbon content of not higher than 10 ppb.

The pure water thus obtained is further purified to obtain an ultrapure water. A typical example of the purification is conducted by irradiating the pure water with ultraviolet ray of a short wavelength to decompose the organic matters contained therein into carbonic acid or carboxylic acid. The pure water thus treated with the ultraviolet ray is then treated with a strong basic anion exchange resin, and is further treated with a mixed bed system of a strong acidic cation exchange resin and a strong basic anion exchange resin to remove ionic substances formed by the ultraviolet ray irradiation. The resultant water is finally treated with an ultrafiltration membrane to remove suspended substances such as colloidal substances present in a very small amount, thereby producing an ultrapure water.

In the preparation of a pure water of a high purity or an ultrapure water, the total organic carbon content of which is not higher than 10 ppb, the water quality of the finally obtained pure water or ultrapure water is largely affected by impurities eluted from the materials constituting the purification apparatuses. Particularly, since an ion exchange resin comprises particles of a small particle size, the ion exchange resin has a very large surface area in comparison with a resin volume, and therefore the pollution by impurities eluted from the ion exchange resin to the finally obtained pure water or ultrapure water is not negligible. That is, when water to be purified passes through the ion exchange resin bed, the impurities in the water are adsorbed and removed by the ion exchange resin, and at the same time a small amount of impurities are eluted from the ion exchange resin. Accordingly, the purity of the water does not reach higher than a certain level of standard. In order to reduce the impurities eluted from the ion exchange resin, water is previously flown through the ion exchange resin column for a long period of time to remove elutable substances in the resin. However, this method consumes a part of water product in the production process, and consequently the efficiency of the process is lowered. Accordingly, an ion exchange resin which does not elute impurities so much during passing water is desired.

Generally, as compared with a sulfonic acid type cation exchange resin, it is difficult to reduce elutable substances from a quaternary ammonium type anion exchange resin simply by passing water, and therefore a quaternary ammonium type anion exchange resin which does not contain elutable substances so much is particularly desired.

The present inventors have studied substances eluted when a regenerated form ion exchange resin comprising a copolymer of a monovinyl aromatic compound and a polyvinyl compound as the matrix is shaken in a hot water at 50° C., and have found that among the eluted substances, an organic compound having a molecular weight of less than 3,000 can be easily adsorbed by an ion exchange resin having a reverse charge, i.e. the organic compound eluted from a basic anion exchange resin can be easily adsorbed by a sulfonic acid type acidic cation exchange resin, but an organic compound having a molecular weight of at least 3,000 can hardly be adsorbed even by an ion exchange resin having a reverse charge, and that this phenomena is particularly remarkable with regard to the substances eluted from a basic anion exchange resin. Accordingly, when water to be purified is flown through a mixed bed ion exchange column comprising a cation exchange resin and an anion exchange resin containing substantially no elutable substances having a molecular weight of at least 3,000, the amount of the eluted substances contained in an ultrapure water obtained is very small. In the production of an ultrapure water, it is general to finally pass water to be purified through a cartridge type mixed bed ion exchange column, and accordingly this discovery means that an ion exchange resin, particularly a basic anion exchange resin, for preparing an ultrapure water is not necessarily washed to completely remove elutable substances, but has only to be washed until elutable substances having a molecular weight of at least 3,000 are substantially removed. Also, this washing step is preferably conducted so as to efficiently remove elutable substances having a molecular weight of at least 3,000.

SUMMARY OF THE INVENTION

An object of the present invention is to provide a method for preparing a pure water or an ultrapure water which is less polluted with substances eluted from an ion exchange resin used.

Another object of the present invention is to provide a method for preparing a pure water or an ultrapure water, the total organic carbon content of which is remarkably little.

A still other object of the present invention is to provide a method for preparing a pure water or an ultrapure water by using a mixed ion exchange bed which does not substantially pollute water with substances eluted from the ion exchange resin.

Thus, the present invention provides a method for preparing an ultrapure water, from which impurities including inorganic salts, organic substances, fine particles and microorganisms are removed, by treatment including an ion exchange treatment, which comprises using an ion exchange resin comprising a copolymer of a polyvinyl compound and a monovinyl aromatic compound which may contain a monovinyl aliphatic compound, as the matrix, at least in a mixed bed ion exchange treatment of the ion exchange treatment, said ion exchange resin used comprising at least a regenerated form ion exchange resin A eluting an organic compound of a molecular weight of less than 3,000 but substantially not eluting an organic compound of a molecular weight of not less than 3,000 when dipped in a hot water at 50° C. for 7 days.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

According to the present invention, an ultrapure water or a pure water of a very high purity can be obtained by passing water through a mixed bed comprising a strong acidic cation exchange resin and a strong basic anion exchange resin comprising, as the matrix, a copolymer of a polyvinyl compound and a monovinyl aromatic compound which may contain a monovinyl aliphatic compound, said strong basic anion exchange resin eluting an organic compound of a molecular weight of less than 3,000 but substantially not eluting an organic compound of a molecular weight of not less than 3,000 when dipped in a hot water at 50° C. for 7 days, and thereby adsorbing and removing even a small amount of ionic impurities dissolved in the water.

Preferably, both of the strong basic anion exchange resin and the strong acidic cation exchange resin used to form the mixed bed, comprise, as the matrix, the copolymer of the polyvinyl compound and the monovinyl aromatic compound which may contain the monovinyl aliphatic compound, and elute an organic compound of a molecular weight of less than 3,000 but does not substantially elute an organic compound of a molecular weight of not less than 3,000 when dipped in a hot water at 50° C. for 7 days.

More preferably, the strong basic anion exchange resin or both of the strong basic anion exchange resin and the strong acidic cation exchange resin used to form the mixed bed do not substantially elute an organic compound having a molecular weight of not less than 2,000.

As mentioned above, an ion exchange resin used for preparing an ultrapure water in accordance with the present invention comprises a copolymer of a monovinyl aromatic compound and a polyvinyl compound as the matrix, characterized by eluting an organic compound having a molecular weight of less than 3,000 but does not substantially elute an organic compound of not less than 3,000 when dipped in a hot water at 50° C. An ion exchange resin which does not substantially elute an organic compound having a molecular weight of not less than 2,000 is more preferable.

An ion exchange resin used for preparing an ultrapure water in accordance with the present invention may contain elutable substances having a molecular weight of less than 3,000, but the amount of such elutable substances should preferably be not more than 300 ppm as an organic carbon measured by the following method of measuring eluates since an excessively larger amount of such elutable substances deteriorates the quality of water. When considering the washing efficiency to remove elutable substances, the amount of the elutable substances is preferably not more than 300 ppm, more particularly not more than 100 ppm as an organic carbon. The elutable substances preferably have a medium scale of molecular weight, and at least 90% of the elutable substances should preferably have a molecular weight of less than 2,000, particularly in the range of from 100 to 1,000.

An ion exchange resin used for preparing an ultrapure water in accordance with the present invention can be prepared by copolymerizing a monovinyl aromatic compound and a polyvinyl compound according to the known method, introducing an ion exchange group into the copolymer and finally washing the resultant copolymer with water followed by an organic solvent which swells the resin to higher extent than water. So, the ion exchange resin, from which elutable substances having a molecular weight of not less than 3,000, preferably not less than 2,000 are substantially removed, is obtained.

A monovinyl aromatic compound is preferably a monovinyl aromatic compound which may have a $C_{1-3}$ alkyl group or a halogen atom as a substituent on the aromatic ring, examples of which include styrene, α-methylstyrene, ethylstyrene, chlorostyrene, vinyltoluene, vinylxylene and vinylnaphthalene, and the most preferable aromatic compound is styrene. Also, if desired, a small amount of a monovinylaliphatic compound may be used in combination with these monovinyl aromatic compounds.

A polyvinyl compound is preferably selected from di- or trivinyl aromatic compounds or di- or trivinyl aliphatic compounds, examples of which include divinylbenzene, trivinylbenzene, divinyltoluene, divinylxylene, divinylnaphthalene, ethyleneglycol di(meth)acrylate, divinylketone, divinylsulfone, diallyl phthalate, diallyl fumarate and diallyl adipate, and among these, the most preferable example is divinylbenzene.

The polyvinyl compound may be used in a small amount of 2% by weight to the total vinyl compounds, generally in an amount of at least 4% by weight, preferably in an amount of at least 6% by weight. As well known, in proportion as the content of the polyvinyl compound increases, the ion exchange resin formed becomes hardly swellable in water and accordingly elutable substances become hardly removable by washing. Also, the polyvinyl compound constitutes the hydrophobic part of the formed ion exchange resin, and therefore if the amount of an ion exchange group which constitutes the hydrophilic part is constant, the ion exchange resin generally becomes easily swellable by an organic solvent than by water in proportion as the amount of the polyvinyl compound increases.

The copolymer of the monovinyl aromatic compound and the polyvinyl compound is generally prepared by suspension polymerization in the presence of a polymerization initiator in an aqueous medium or in a solvent which dissolves a mono- or polyvinyl compound but does not dissolve a copolymer.

In this manner, a bead-like copolymer in the most preferable form for use can be obtained. Generally, in the aqueous medium, a gel type copolymer can be obtained, and in the solvent medium, a porous type resin can be obtained. Examples of a polymerization catalyst include benzoyl peroxide, tertiary-butyl peroxide, lauroyl peroxide and azobisisobutyronitrile. The temperature of the polymerization reaction depends on the type of the catalyst used, but is generally in the range of from 50° to 100° C.

An ion exchange group such as a sulfonic acid group and an amino group is introduced into the copolymer thus obtained by a known method. For instance, the introduction of the amino group is conducted in the following manner. At first, a haloalkylating agent is applied to the copolymer by a well known method to prepare a haloalkylated copolymer. Examples of the haloalkylating agent include chloromethylmethylether, chloroethylmethylether, chloromethylethylether, bromomethylmethylether, bromoethylmethylether and bromomethylethylether. Examples of a catalyst for the haloalkylation include zinc chloride, anhydrous aluminum chloride, tin chloride and iron chloride. The catalyst is used in an amount of from 1 to 100% by weight to the weight of the copolymer, and in the case of the same copolymer, the degree of a haloalkylation can be controlled by varying the amount of the catalyst. Also, in order to maintain the same haloalkylation rate, the amount of the catalyst must be increased in proportion as the ratio of the polyvinyl compound in the copolymer used becomes larger. Also, in another method, the haloalkylation can be conducted by using a solution of methanol, a chlorine-containing reagent selected from the group consisting of hydrochloric acid, chlorosulfuric acid, sulfuryl chloride, thionyl chloride, acyl chloride, phosphorus trichloride, phosphorus pentachloride and aluminum chloride, and formalin or a formalin precursor selected from the group consisting of paraformaldehyde and trioxane which forms formalin during the reaction.

The reaction is generally conducted in the presence of an organic solvent which swells the copolymer, such as ethylene dichloride, propylene dichloride, benzene and toluene, but the swelling solvent may be replaced by a large amount of a haloalkylating agent. The reaction is usually conducted at a temperature of from 40° to 60° C. for several hours to one day.

The copolymer thus haloalkylated is then reacted with various amines such as trimethylamine and dimethylethanolamine, thus producing a basic anion exchange resin having properties corresponding to the type of the amine used. Particularly, if a tertiary amine is reacted, a strong basic resin can be obtained. Examples of the tertiary amine include trialkylamines and dialkyl-(mono)alkanolamines, which have a $C_{1-4}$ alkyl or alkanol group.

The basic anion exchange resin thus obtained is fully washed with water to remove the remaining amines, and is then converted into a regenerated form, i.e. a hydroxide form, with an aqueous solution of sodium hydroxide and is further washed with water. The ion exchange resin is swollen when it is converted into the hydroxide form, and in the case of the anion exchange resin used in the present invention, the hydroxide form has a volume of at least 110% to the Cl form. An ion exchange resin, the hydroxide form of which has a volume of at least 120%, is more preferable. After washing the hydroxide form ion exchange resin with water, the water-washed ion exchange resin is then washed with an organic solvent to substantially completely remove elutable substances having a molecular weight of at least 3,000, preferably at least 2,000. In order to efficiently conduct the washing with the organic solvent, the hydroxide form ion exchange resin should preferably swell larger in methanol than in water.

As the organic solvent, methanol is preferably used, but alcohols such as ethanol, propanol and butanol, ketones such as acetone and methylethylketone, acetonitrile, N,N-dimethylformamide and the like may also be used if desired. These organic solvents are preferably used in an aqueous solution having a concentration of at least 60% by weight, preferably at least 80% by weight, more preferably at least 90% by weight. In any case, an organic solvent used for washing should swell a regenerated form ion exchange resin larger than in water. Particularly, with regard to a regenerated form ion exchange resin, an organic solvent used for washing should preferably give a volume increase of at least 4% larger than the volume in water.

Since the swelling of an ion exchange resin in water and in an organic solvent varies depending on the type and the amount of a polyvinyl compound and the introduced amount of an ion exchange group, it is preferable to select a washing solvent on the basis of an ion exchange resin used. On the other hand, in order to prepare an ion exchange resin easily washable with an organic solvent, the ratio of a polyvinyl compound in the matrix may be increased or the introducing amount of an ion exchange group may be restricted to make the ion exchange resin more hydrophobic. For example, the introduced amount of an ion exchange group should be preferably not more than 4.0 meq/g as an exchange capacity. The washing is preferably conducted by charging an ion exchange resin into a column, flowing an organic solvent through the column upwardly or downwardly, and then flowing an ultrapure water. The amount of the organic solvent used is at least one time amount, generally at least 2 times amount, preferably at least 4 times amount of the volume of the regenerated form ion exchange resin. The ultrapure water is flown until the organic solvent is completely removed. The temperature of the column during washing is decided in view of the type of an organic solvent used, dangerousness and washing efficiency, but the washing efficiency usually becomes higher in proportion as the temperature becomes higher.

The washing is conducted until an organic compound having a molecular weight of at least 3,000, preferably at least 2,000, is not substantially detected by the following measuring method. The phraseology, "substantially not detectable" here means the state that the amount of an organic compound eluted is not higher than 3 ppm, preferably not higher than 1 ppm, as an organic carbon when the organic compound is eluted in accordance with the following method and the amount of the eluate and its molecular weight distribution are measured. In this calculation, the rate of carbon in a molecule is determined to be constant regardless of its molecular weight. A small amount of an organic compound having a molecular weight of less than 3,000 may remain. In order to completely remove this organic compound, the washing step must be excessively repeated, thereby the efficiency being lowered. The presence of a small amount of the organic compound does not badly affect the quality of water. It is generally preferable to conduct the washing until the amount of the eluate is reduced to not more than 300 ppm, preferably not more than 100 ppm, as an organic carbon measured by the following method.

In the present invention, the above prepared anion exchange resin having impurities reduced is combined with a cation exchange resin to constitute a mixed bed. The impurities contained in the cation exchange resin also should be preferably reduced in the above-mentioned manner, but a cation exchange resin having a relatively large amount of impurities may also be used. This is because an organic compound having a molecular weight of not less than 3,000 eluted from the cation exchange resin is mainly a sulfonated oligomer formed in the production of the ion exchange resin matrix and is easily trapped by an anion exchange resin used in combination. Water previously purified to remove the majority of the impurities contained therein is flown through the above constituted mixed bed to produce a pure water or an ultrapure water. If desired, the pure water or ultrapure water thus produced is further purified by passing through a purifying membrane such as an ultrafiltration membrane. In the present invention, water passed through the above mentioned mixed bed is carried to a course point without being purified by an ion exchange resin any more. That is, the ion exchange resin containing only a small amount of elutable substances used in the present invention is used in the final stage of the production of a pure water or ultrapure water, and is usually used in a cartridge type ion exchange bed, the ion exchange resin of which is not usually regenerated in the actual spot. Accordingly, water to be flown through this resin bed is previously purified to remove the majority of the impurities contained therein. Generally, a purified water having a specific resistance of at least 12MΩ·cm or the total organic carbon content of not higher than 30 ppb is treated by this ion exchange resin bed. For instance, according to a typical example of the present invention, water is previously purified so as to have a specific resistance of at least 12MΩ·cm and the total organic carbon content of not higher than 30 ppb by means of ion exchange resin treatment, degassing under reduced pressure, reverse osmosis membrane treatment and the like, and is then flown through the mixed bed comprising the strong basic anion exchange resin of the present invention. The water thus purified is further sterilized to kill microorganisms by irradiating with ultraviolet ray, and is then further purified by a membrane purification device including an ultrafiltration membrane to remove suspended substances, thereby producing an ultrapure water. In another typical example, the above mentioned pure water is irradiated with ultraviolet ray having a short wavelength, e.g. 185 nm, to decompose organic substances contained therein into carboxylic acid or carbonic acid, and is then passed through the mixed bed comprising the strong basic anion exchange resin of the present invention to produce an ultrapure water. It is more preferable to pass the water through the strong basic anion exchange resin bed used in the present invention before passing through the mixed bed or to further treat the water passed through the mixed bed with an ultrafiltration membrane.

Now, the present invention will be described in further detail with reference to Examples. However, it should be understood that the present invention is by no means restricted to such specific Examples.

In the present invention, a swollen volume of an ion exchange resin as well as an amount of an organic carbon eluted when dipped in hot water and its molecular weight are measured in the following manner.

Measurement of Swollen Volume

A Cl form resin is placed in a 10 ml measuring cylinder containing water to exactly take 10.0 ml of the resin out. The resin is then placed in a column, and 1N sodium hydroxide aqueous solution is passed through the column at SV=5 for 1 hour and is further washed with a desalted water to prepare a regenerated form resin. This resin is placed in a 25 ml measuring cylinder, and its volume is measured to determine the volume of the regenerated form resin swollen in water. Also, the above prepared regenerated form resin is placed in a column, and methanol is passed through the column at SV=1 for 4 hours. Thereafter, this resin is placed in a 25 ml measuring cylinder to determine the volume swollen in methanol. In the case of using other organic solvents, the measurement is conducted in the same manner as above.

Measurement of Amount of Eluted Organic Carbon

A regenerated form ion exchange resin fully swollen in an ultrapure water is placed in a 100 ml measuring cylinder together with the water, and the upper surface of the water and the resin is adjusted to correspond to the marked line of 100 ml. After removing the water present between resin particles by filtration, the resin was placed in a 500 ml flask, and 100 ml of an ultrapure water is added thereto. The flask was dipped in a water bath at 50° C., and the flask is shaken at 100 times per minute for 7 days, i.e. 168 hours. After finishing the shaking, the ion exchange resin is filtered out by a 0.45μ Teflon filter manufactured by Milipore Company Ltd.

20 μl of the filtrate is placed in a total organic carbon analyzer TOC-10B manufactured by Shimazu Seisakusho K. K., and the height of the detection peak is measured to calculate the total organic carbon concentration of the filtrate. The detection line for calculation is determined by using potassium hydrogen phtharate as the standard material on the basis of solutions having carbon concentrations respectively of 40 ppm, 100 ppm, 200 ppm and 400 ppm.

Measurement of Molecular Weight of Eluted Substance

The above obtained filtrate is analyzed by a gel permeation chromatography under the following conditions.

Column: Aqueous type GPC column (Asahi Pack G310 and G510 connected in direct series manufactured by Asahi Kasei Kogyo K. K.)
Developing liquor: 0.01N-HCl
Flowing speed: 0.5 ml/min
Temperature: 25° C.
Detection: UV240 nm
Flowing amount: 200 μl

COMPARATIVE EXAMPLE 1

94.6 parts by weight of styrene, 5.4 parts by weight of divinylbenzene (purity=55.8%) and 0.5 part by weight of dibenzoyl peroxide were fully mixed, and the resultant mixture was mixed with 300 parts by weight of water having 0.5 part by weight of polyvinyl alcohol dissolved. Suspension polymerization was conducted while stirring the resultant mixture at 80° C. for 10 hours, and the product was washed with water and dried to obtain a particle-like copolymer. The polymerization yield was 95% by weight on the basis of the starting monomers.

100 parts by weight of the above prepared copolymer was mixed with 500 parts by weight of chloromethylmethylether while stirring at room temperature for 1 hour, and 10 parts by weight of zinc chloride was further added thereto to conduct chloromethylation at 50° C. for 10 hours.

After the reaction, the reaction product was cooled and water was added thereto to decompose the remaining reagent. The chloromethylated copolymer thus obtained was fully washed with water, and was added to 300 parts by weight of a 10% by weight aqueous solution of trimethylamine to conduct amination while maintaining the resultant mixture at 50° C. for 10 hours.

After the amination, the remaining trimethylamine was vaporized and removed by heating, and the resultant product was fully washed with water to obtain a basic anion exchange resin (I).

The anion exchange resin thus obtained was charged in a column, and a regenerated form anion exchange resin (A) was obtained by passing a 5 time-volume amount of 1N-NaOH aqueous solution through the column at SV=5 and further passing a desalted water therethrough to wash the resin.

EXAMPLE 1

The basic anion exchange resin (I) obtained in the above Comparative Example 1 was charged in the column, and a regenerated form anion exchange resin (B) was obtained by passing a 5 time-volume amount of 1N-NaOH aqueous solution through the column at SV=5, passing a desalted water therethrough to wash the resin, passing a 4 time-volume amount of 100% methanol therethrough at SV=1 and passing a desalted water therethrough to fully wash the resin. The temperature of the column was maintained at 25° C. during the process.

EXAMPLE 2

A regenerated form anion exchange resin (C) was obtained in the same manner as in Comparative Example 1 and Example 1, except that 87.4 parts by weight of styrene, 12.6 parts by weight of divinylbenzene (purity=55.6%) and 0.5 part by weight of dibenzoyl peroxide were used.

EXAMPLE 3

85.6 parts by weight of styrene, 14.4 parts by weight of divinylbenzene (purity=55.6%), 70 parts by weight of isooctane and 1 part by weight of dibenzoyl peroxide were fully mixed, and the resultant mixture was added to 400 parts by weight of water containing 0.7 part by weight of polyvinyl alcohol dissolved. The resultant mixture was subjected to suspension polymerization while stirring at 80° C. for 10 hours.

After the reaction, isooctane was removed by azeotropic distillation with water, and the resultant product was further washed with water and dried to obtain a particle-like copolymer. The polymerization yield was 92% by weight on the basis of the starting monomers. 200 parts by weight of ethylene dichloride and 300 parts by weight of chloromethylmethylether were added to 100 parts by weight of the above prepared copolymer while stirring at room temperature for 1 hour, and 50 parts by weight of zinc chloride was further added to the resultant mixture to conduct chloromethylation at 50° C. for 10 hours.

After the reaction, the reaction product was cooled, and water was added thereto to decompose the remaining reagent. The chloromethylated copolymer thus obtained was fully washed with water, and was then added to 400 parts by weight of a 10% by weight aqueous solution of trimethylamine to conduct amination at 50° C. for 10 hours. After the amination, the remaining trimethylamine was vaporized and removed by heating, and the resultant product was fully washed with water to obtain a basic anion exchange resin.

The anion exchange resin thus obtained was charged in a column, and a 5 time-volume amount of 1N-NaOH aqueous solution was passed through the column at SV=5 and a desalted water was further passed through the column to wash the resin. Thereafter, a 2 time-volume amount of 100% ethanol was passed through the column at SV=1, and a desalted water was further passed through the column to wash the resin, thus obtaining a regenerated form anion exchange resin (D).

The anion exchange resin thus obtained was measured with regard to the ion exchange capacity, the volumes swollen respectively in water, 100% methanol and 100% ethanol as well as the total organic carbon amount eluted, and the results are shown in Table 1.

TABLE 1

| Sample | Ion exchange capacity (meq/g) | Swollen volume of the regenerated form resin | | | Total organic carbon (ppm) |
|---|---|---|---|---|---|
| | | Water | Methanol | Ethanol | |
| A | 4.0 | 12.2 | 13.4 | 14.7 | 355 |
| B | 4.0 | 12.2 | 13.4 | 14.7 | 76 |
| C | 3.5 | 12.4 | 12.9 | 12.9 | 32 |
| D | 3.7 | 12.4 | 12.8 | 12.5 | 50 |

TEST EXAMPLE 1

370 ml of a regenerated from cation exchange resin "Diaion" SKNUPA ("Diaion" is a registered trade mark of Mitsubishi Kasei Corporation) usable for atomic power, which was treated by sulfonating a styrene-divinylbenzene copolymer and fully washing to substantially reduce elutable substances, was fully mixed with 630 ml of each of the anion exchange resins A to D prepared in Comparative Example 1 and Examples 1 to 3, and the resultant mixture was charged in a column having an inside diameter of 50 mm to form a mixed bed.

Figure 1:
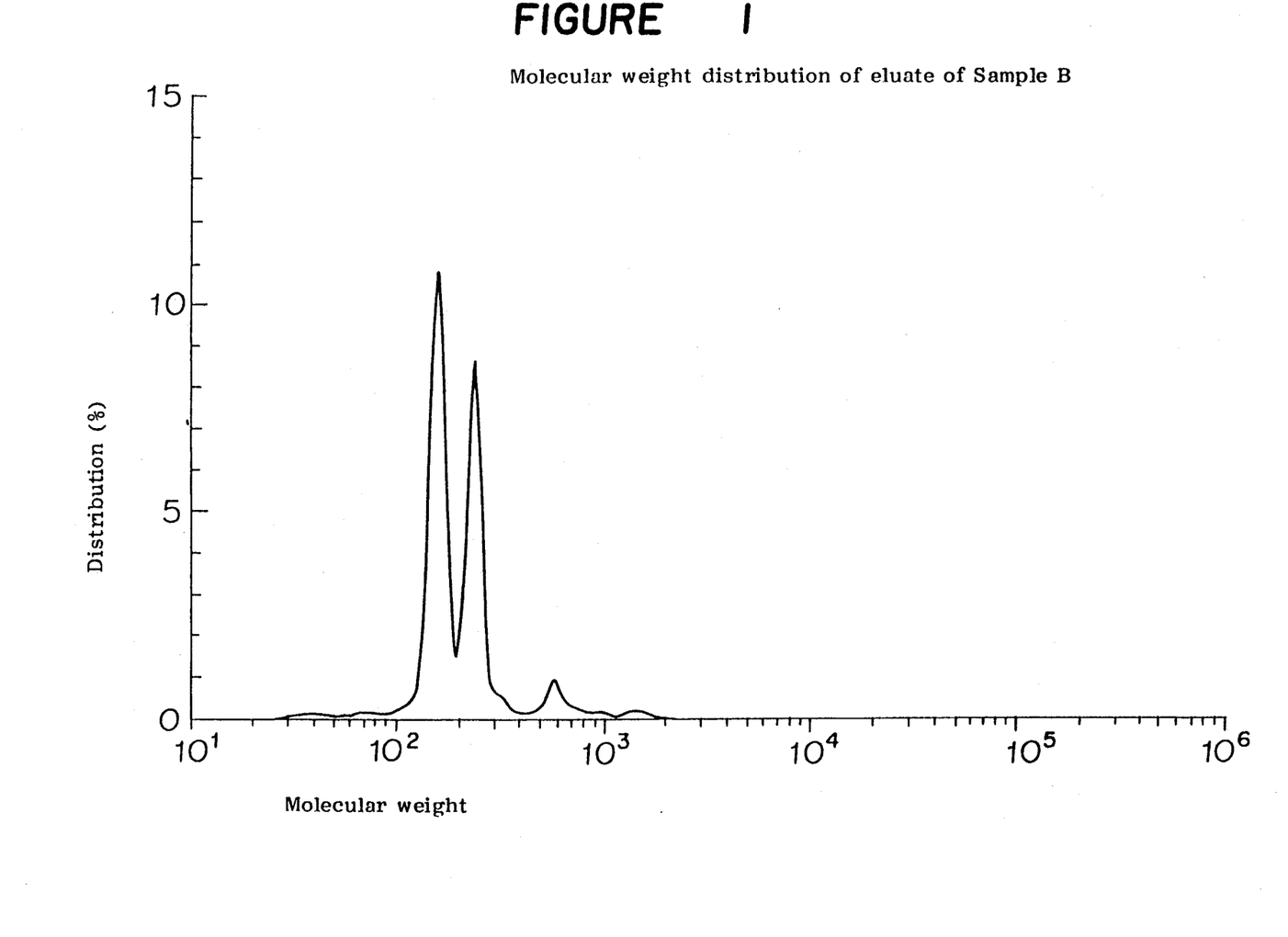
FIGS. 1 to 4 show graphs illustrating molecular weight distributions of the substances eluted from the anion exchange resins prepared respectively by Comparative Example 1 and Examples 1 to 3.
Figure 2:
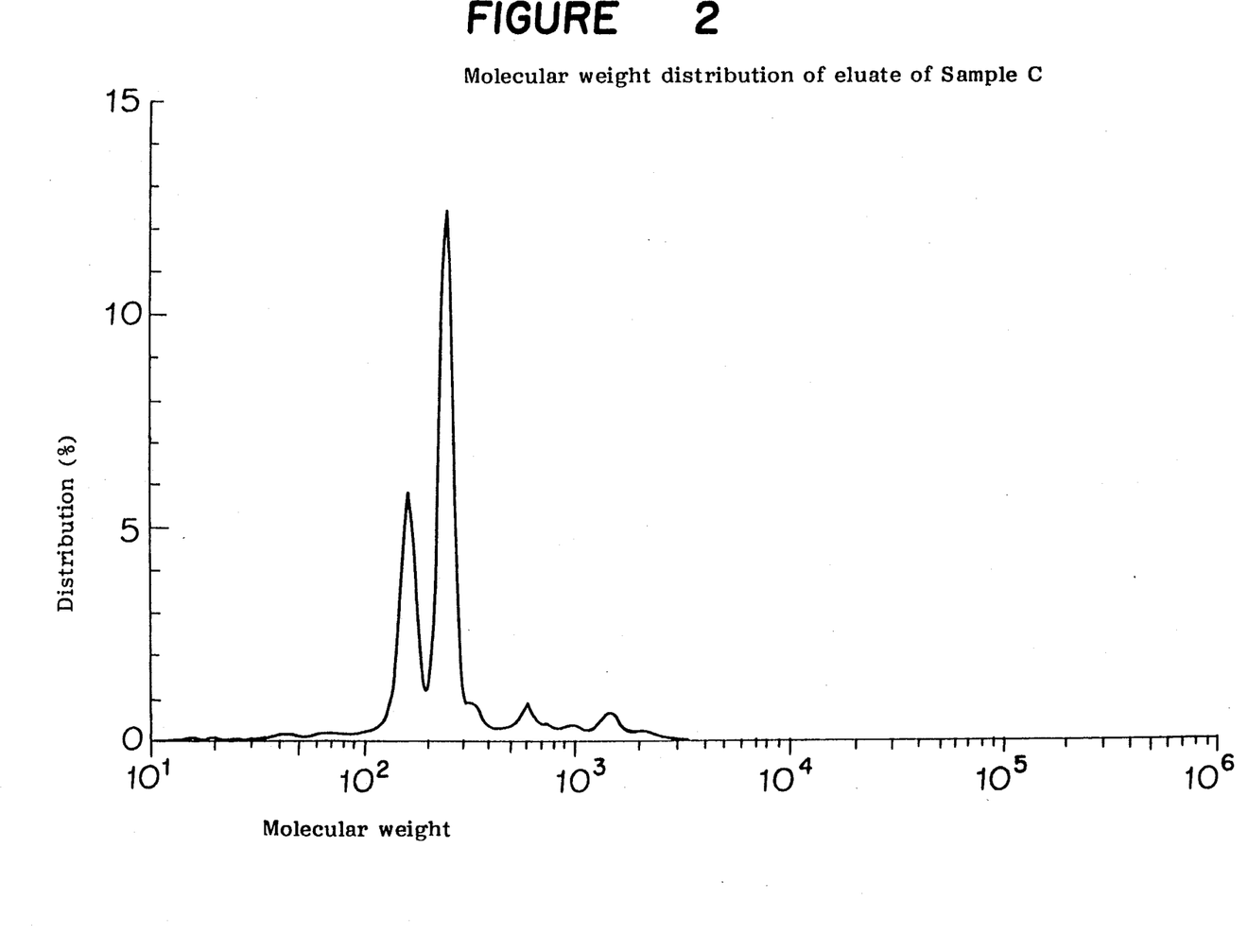
Figure 3:
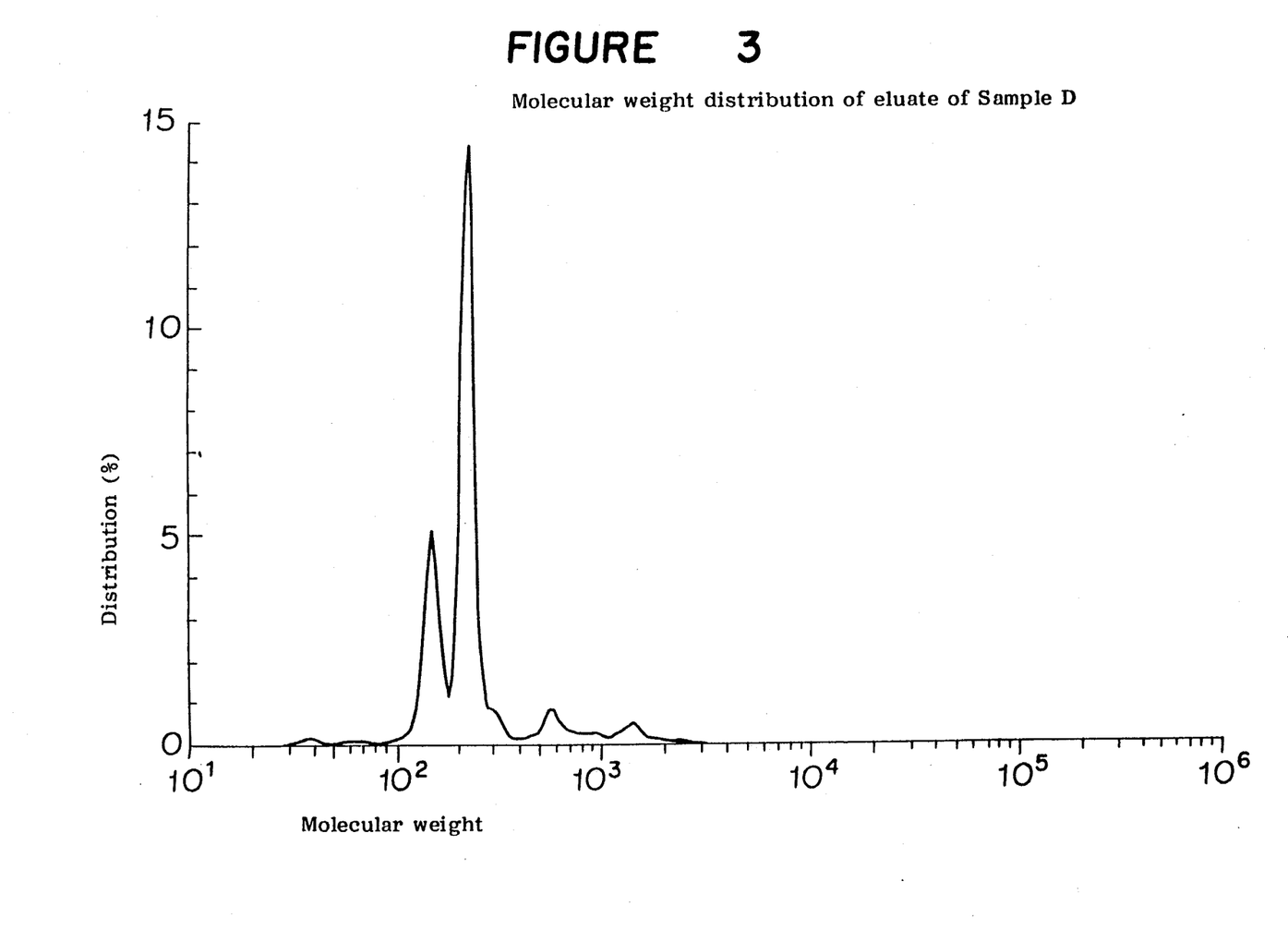
Figure 4:
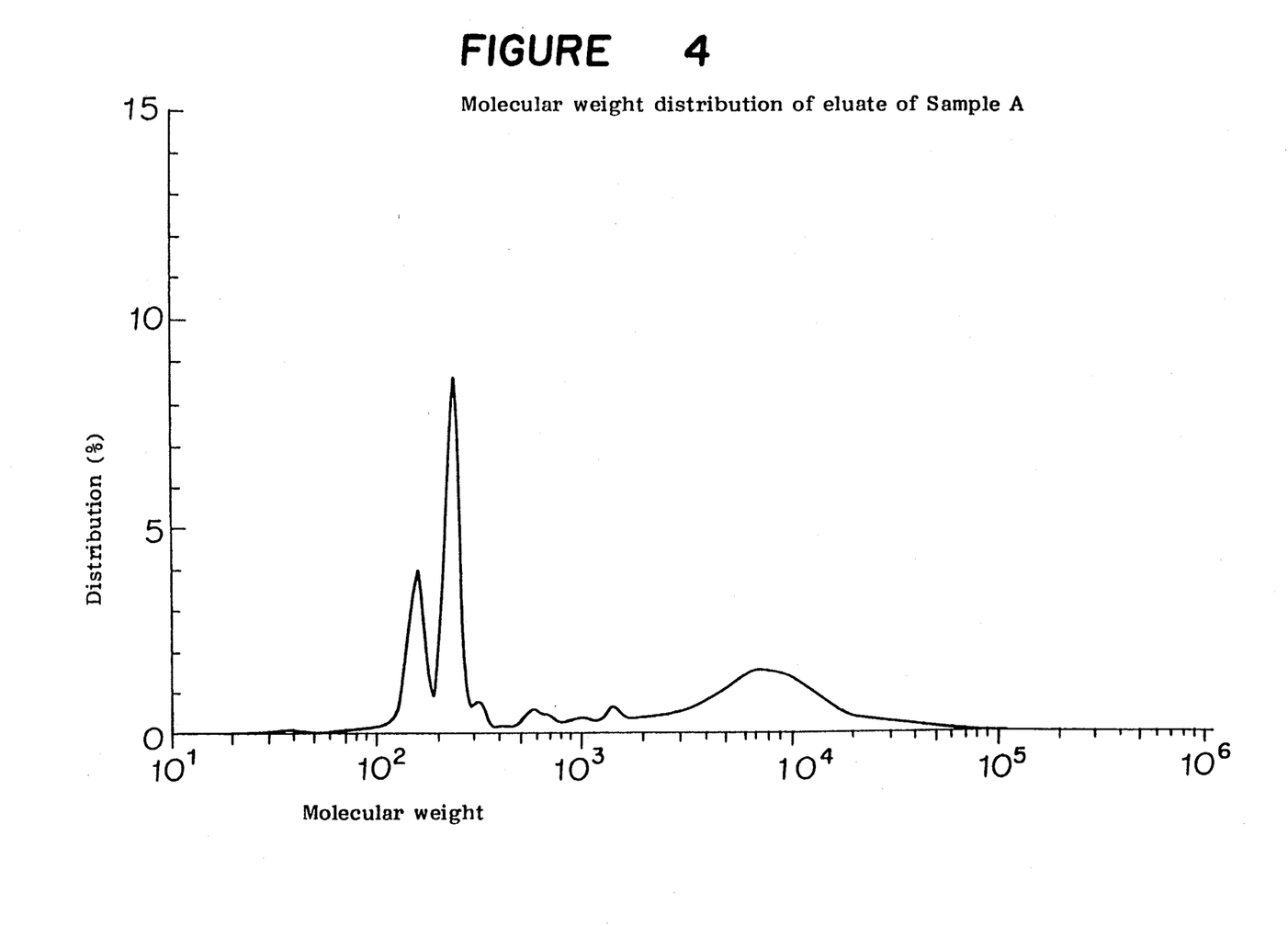
Figure 5:
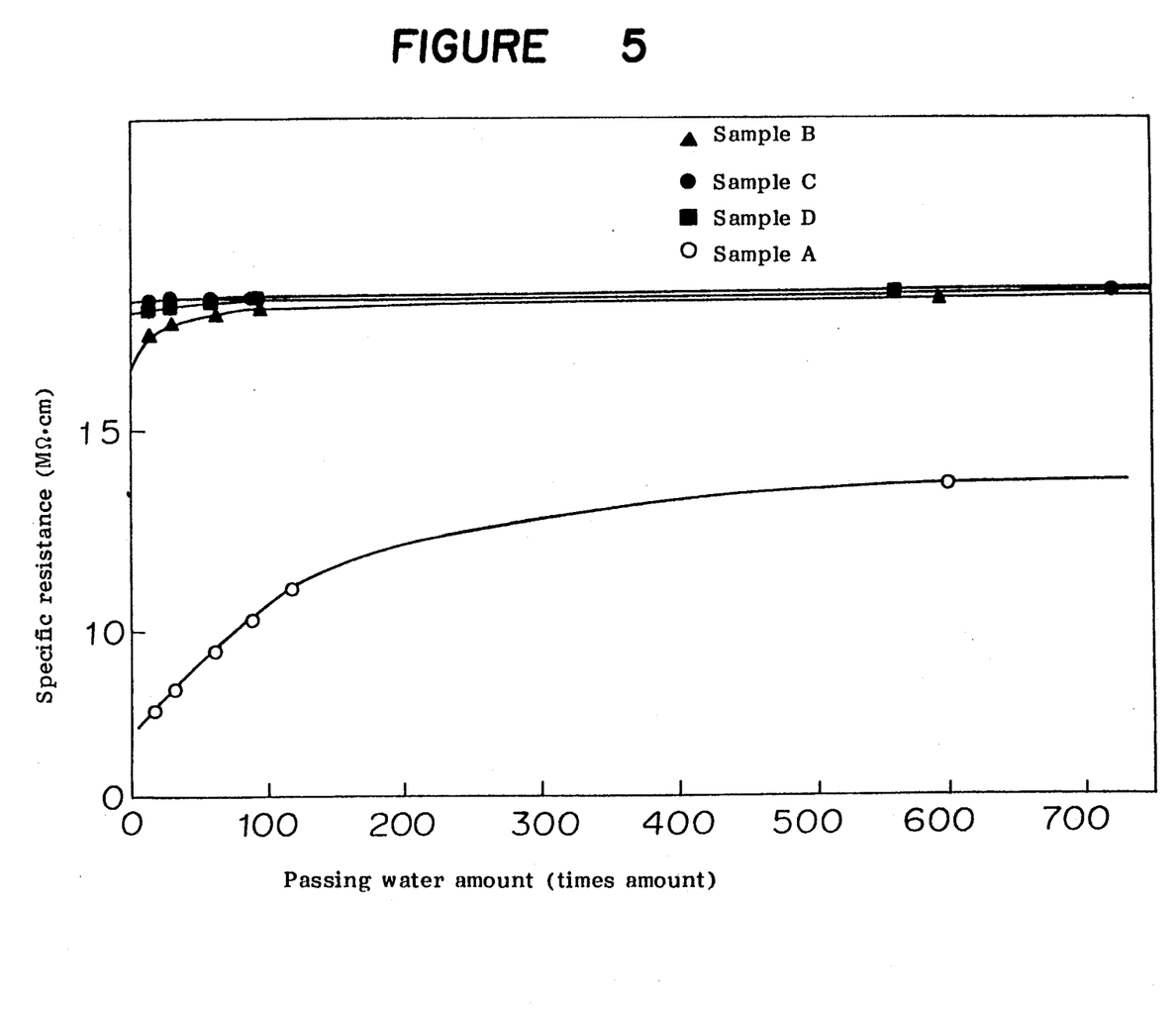
FIG. 5 shows a graph illustrating the relationship between the specific resistance of an outflow water and a passing water amount when an ultrapure water is passed through a mixed bed comprising Diaion ® SKNUPA and the anion exchange resins prepared respectively by Comparative Example 1 and Examples 1 to 3.
Figure 6:
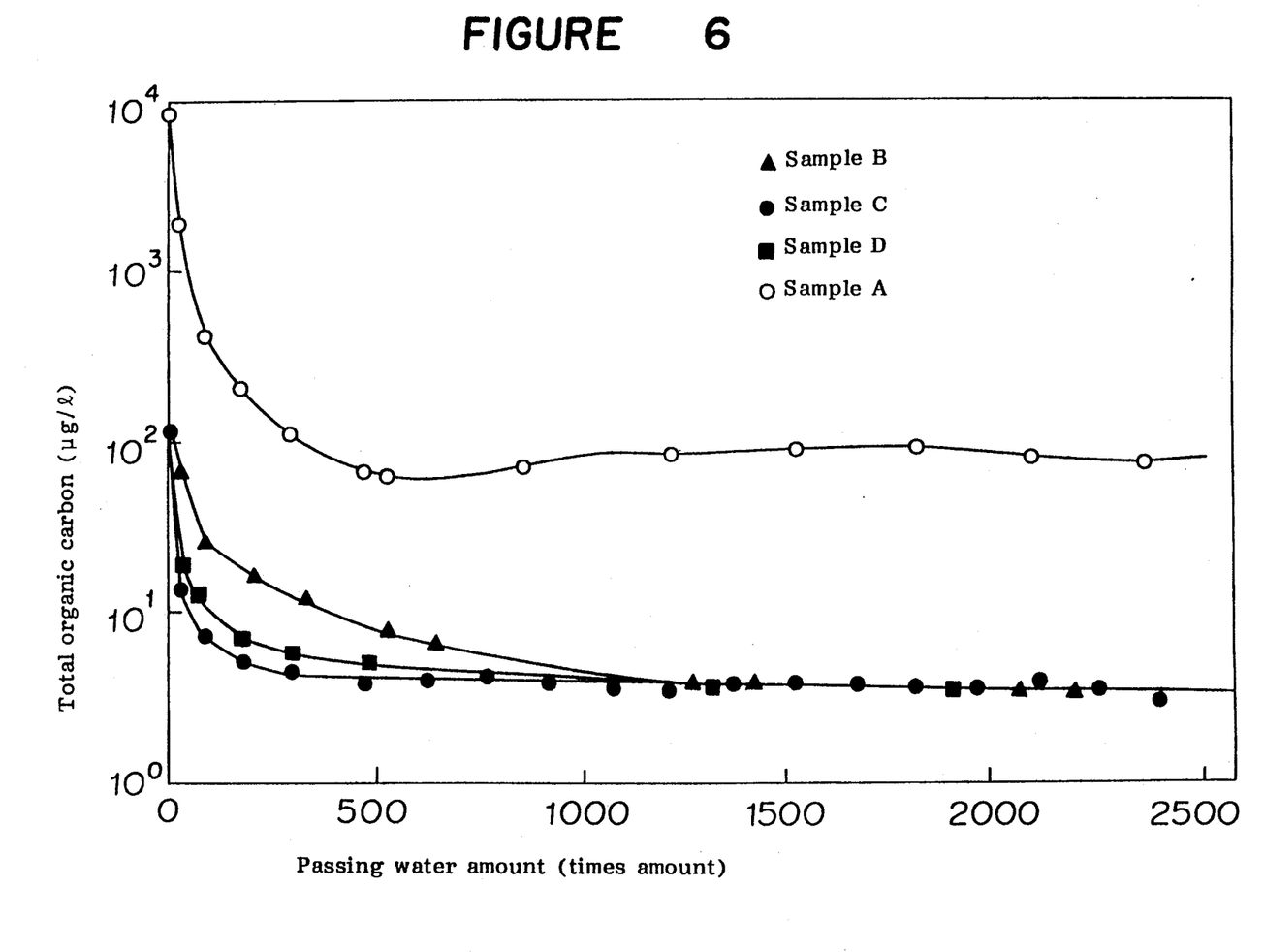
FIG. 6 shows a graph illustrating the relationship between the total organic carbon concentration of an outflow water and a passing water amount when an ultrapure water is passed through a mixed bed comprising Diaion ® SKNUPA and the anion exchange resins prepared by Comparative Example 1 and Examples 1 to 3.

An ultrapure water (total organic carbon=3 ppb) was flown through the above formed mixed bed at 25° C. and SV=30, and the electric conductivity and the total organic carbon amount of the water flown out of the column were measured. The results are shown in FIGS. 5 and 6.

EXAMPLES 4

The same procedure as in Example 2 was repeated, except that methanol aqueous solutions having the following concentrations were flown through the column in a 4 time-volume amount at SV=1. The temperature of the column was maintained at 40° C. during the process.

The resins treated by the methanol aqueous solutions having the following respective methanol concentrations were referred to as Samples E to I respectively. The resin which was not treated with methanol was referred to as Sample J.

TABLE 2

| Methanol solvent concentration (%) | Sample | Volume of the regenerated resin in the respective methanol solvents (ml) |
|---|---|---|
| 100 | E | 10.7 |
| 80 | F | 10.6 |
| 60 | G | 10.5 |
| 40 | H | 10.4 |
| 20 | I | 10.2 |
| — | J | 10.0 |

TEST EXAMPLE 2

Figure 7:
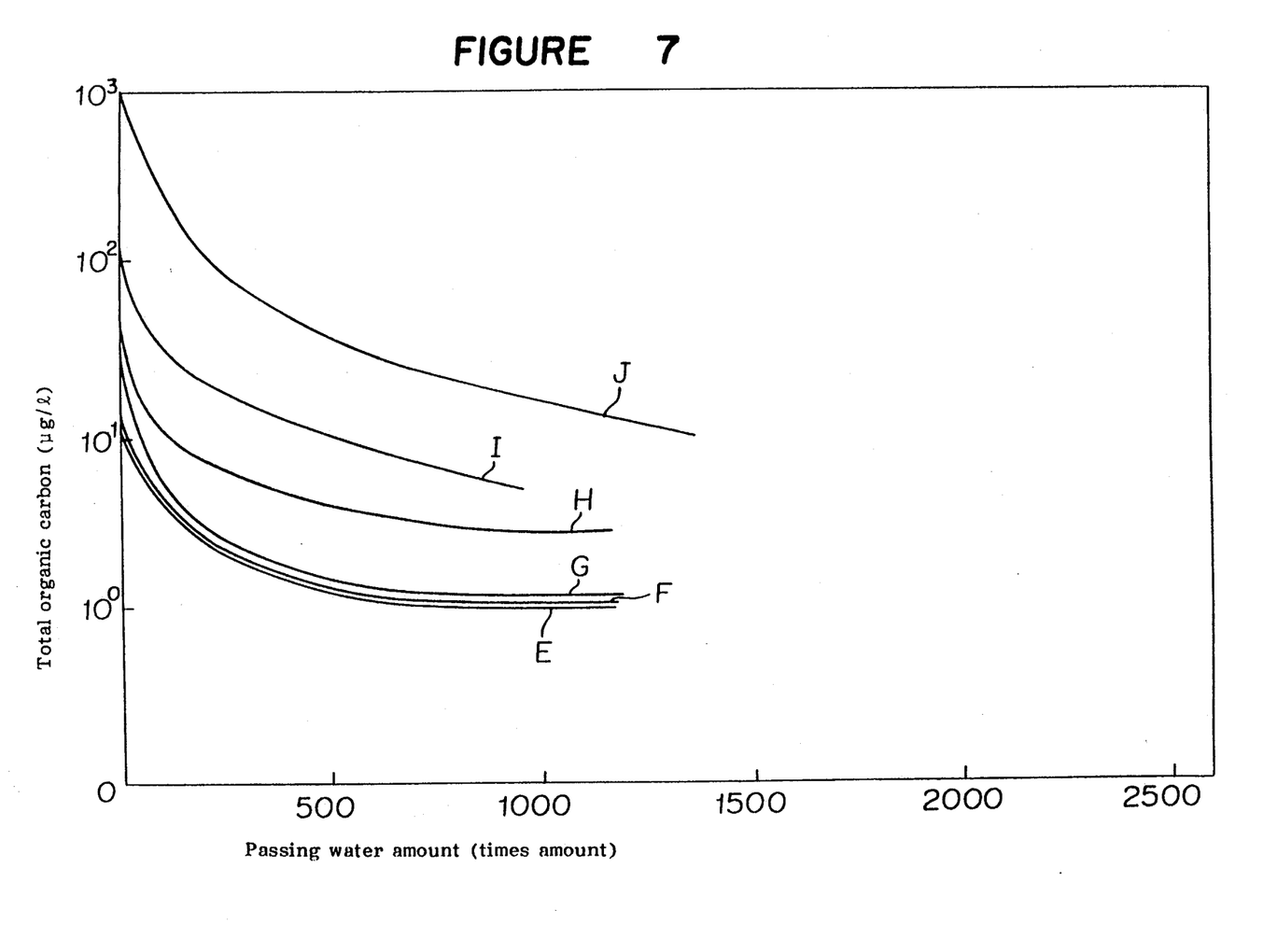
FIG. 7 shows a graph illustrating the relationship between the total organic carbon concentration of an outflow water and a passing water amount when an ultrapure water is passed through a mixed bed comprising Diaion ® SKNUPA and Comparative Sample J or the anion exchange resin Samples E to I prepared by Example 4.

The same procedure as in Test Example 1 was repeated, except that the above prepared Samples E, F, G, H, I and J were respectively used. The results of the measurement of the total organic carbon amounts are shown in FIG. 7.

Obviously, numerous modifications and variations of the present invention are possible in light of the above teachings. It is therefore to be understood that within the scope of the appended claims, the invention may be practiced otherwise than as specifically described herein.

What is claimed is:

1. A method for preparing ultrapure water, including removing impurities including inorganic salts, organic substances, fine particles and microorganisms, comprising flowing water to be purified through an ion exchange resin containing a copolymer comprising a polyvinyl compound and a monovinyl aromatic compound as a matrix, said ion exchange resin further comprising a regenerated form ion exchange resin eluting an organic compound of a molecular weight of less than 3,000 but substantially not eluting an organic compound of a molecular weight of not less than 3,000 when dipped in a hot water at 50° C. for 7 days.

2. The method for preparing ultrapure water according to claim 1, wherein the regenerated form ion exchange resin is an ion exchange resin prepared by converting an ion exchange resin having a matrix containing a copolymer comprising a monovinyl aromatic compound and a polyvinyl compound into a regenerated form, washing the regenerated form ion exchange resin with water followed by an organic solvent which swells the resin to higher extent than water, and further washing the resultant ion exchange resin with water to remove the organic solvent.

3. The method for preparing ultrapure water according to claim 2, wherein the matrix further comprises a monovinyl aliphatic compound in an amount of no more than 10% by weight on the basis of the total weight of the monovinyl aromatic compound and the polyvinyl compound, the monovinyl aliphatic compound being selected from the group consisting of methylmethacrylate, methylacrylate, acrylonitrile, 2-hydroxyethylmethacrylate and methacrylic acid.

4. The method for preparing ultrapure water according to claim 2, wherein the regenerated form ion exchange resin has a volume of at least 120% on the basis of an unregenerated form resin.

5. The method for preparing an ultrapure water according to claim 2, wherein the organic solvent having a swelling power larger than water is a solvent having at least 60% solvent concentration, which swells the regenerated form ion exchange resin so as to give a volume at least 4% larger than the volume in water and is selected from the group consisting of a lower alcohol, an aliphatic ketone, acetonitrile and N,N-dimethylformamide.

6. The method for preparing ultrapure water according to claim 2, wherein the solvent having a swelling power larger than water is a solvent having a solvent concentration at least 80%, selected from the group consisting of methanol, ethanol, propanol, butanol, acetone, methylethylketone, acetonitrile and N,N-dimethylformamide.

7. The method for preparing ultrapure water according to claim 6, wherein the solvent having a swelling power larger than water is ethanol having a concentration of from 80% to 100%.

8. The method for preparing ultrapure water according to claim 2, wherein the organic solvent which swells the resin to a higher extent than water is used in a volume amount of at least the volume of the resin to be washed.

9. The method for preparing ultrapure water according to claim 8, wherein the organic solvent is used in a volume amount of at least 2 times the volume of the resin to be washed.

10. The method for preparing ultrapure water according to claim 8, wherein the organic solvent is used in a volume amount of at least 4 times the volume of the resin to be washed.

11. The method for preparing ultrapure water according to claim 1, wherein the regenerated form ion exchange resin is an anion exchange resin in a mixed bed ion exchange treatment.

12. The method for preparing ultrapure water according to claim 11, wherein the regenerated form ion exchange resin is a strong basic anion exchange resin.

13. The method for preparing ultrapure water according to claim 1, wherein substantially all of the ion exchange resin used is the regenerated form ion exchange resin.

14. The method for preparing ultrapure water according to claim 1, wherein the monovinyl aromatic compound has a substituent on the aromatic ring selected from the group consisting of a $C_{1-3}$ alkyl group and a halogen atom.

15. The method for preparing ultrapure water according to claim 14, wherein the monovinyl aromatic compound is a compound selected from the group consisting of styrene, α-methylstyrene, ethylstyrene, chlorostyrene, vinyltoluene, vinylxylene and vinylnaphthalene.

16. The method for preparing ultrapure water according to claim 15, wherein the monovinyl aromatic compound is styrene.

17. The method for preparing ultrapure water according to claim 1, wherein the polyvinyl compound is a compound selected from the group consisting of a di- or trivinyl aromatic compound and a di- or trivinyl aliphatic compound.

18. The method for preparing ultrapure water according to claim 17, wherein the polyvinyl compound is a compound selected from the group consisting of divinylbenzene, trivinylbenzene, divinyltoluene, divinylxylene, divinylnaphthalene, ethyleneglycoldiacrylate, ethyleneglycoldimethacrylate, divinylketone, divinylsulfone, diallylphthalate, diallylphmalate and diallyladipate.

19. The method for preparing ultrapure water according to claim 18, wherein the polyvinyl compound is divinylbenzene.

20. The method for preparing ultrapure water according to claim 1, wherein the regenerated form ion exchange resin used is an anion exchange resin prepared by suspension-polymerizing a monovinyl aromatic compound and a polyvinyl compound in an aqueous medium in the presence of a polymerization initiator, introducing an anion exchange group thereto and then converting the groups into OH form.

21. The method for preparing ultrapure water according to claim 20, wherein the anion exchange resin used is prepared by haloalkylating the bead copolymer resin obtained by suspension polymerization, introducing a quaternary ammonium group therein by reacting with a tertiary amine and then converting the groups into an OH form with sodium hydroxide.

22. The method for preparing ultrapure water according to claim 21, wherein the haloalkylation reaction is carried out by using a haloalkylating agent selected from the group consisting of chloromethylmethylether, chloroethylmethylether, chloromethylethylether, bromomethylmethylether, bromoethylmethylether and bromomethylethylether, in the presence of a catalyst selected from the group consisting of zinc chloride, anhydrous aluminum chloride, tin chloride and iron chloride, in an organic solvent selected from the group consisting of ethylene dichloride, benzene, toluene and propylene dichloride, which swells the copolymer comprising the monovinyl aromatic compound and the polyvinyl compound.

23. The method for preparing ultrapure water according to claim 21, wherein the haloalkylation reaction is carried out by reacting the copolymer of the monovinyl aromatic compound and the polyvinyl compound with a solution of a chlorine-containing reagent selected from the group consisting of hydrochloric acid, chlorosulfuric acid, sulfuryl chloride, thionyl chloride, acyl chloride, phosphorus trichloride, phosphorus pentachloride and aluminum chloride, an alcohol and formalin or a formalin precursor selected from the group consisting of paraformaldehyde and trioxane, which forms formalin during the reaction.

24. The method for preparing ultrapure water according to claim 21, wherein the haloalkylation reaction is carried out by reacting the copolymer comprising the monovinyl aromatic compound and the polyvinyl compound with a solution comprising hydrochloric acid, methanol and formalin.

25. The method for preparing ultrapure water according to claim 21, wherein the tertiary amine is a compound selected from the group consisting of a trialkyl amine and a dialkyl-alkanol amine.

26. The method for preparing ultrapure water according to claim 25, wherein the tertiary amine is a trialkyl amine having a $C_{1-4}$ alkyl group.

27. The method for preparing ultrapure water according to claim 25, wherein the tertiary amine is a dialkyl-alkanol amine having a $C_{1-4}$ alkanol group.

28. The method for preparing ultrapure water according to claim 20, wherein the amount of the polyvinyl compound used in the suspension-polymerization is not less than 2% by weight on the basis of the total weight of the monovinyl aromatic compound and the polyvinyl compound.

29. The method for preparing ultrapure water according to claim 20, wherein the amount of the polyvinyl compound used in the suspension-polymerization is not less than 4% by weight on the basis of the total weight of the monovinyl aromatic compound the polyvinyl compound.

30. The method for preparing ultrapure water according to claim 20, wherein the amount of the polyvinyl compound used in the suspension-polymerization is not less than 6% by weight on the basis of the total weight of the monovinyl aromatic compound and the polyvinyl compound.

31. The method for preparing ultrapure water according to claim 1, wherein the regenerated form ion exchange resin used is an anion exchange resin prepared by suspension-polymerizing the monovinyl aromatic compound and the polyvinyl compound in an aqueous medium in the presence of a polymerization initiator and a solvent dissolving these starting compounds but not dissolving the copolymer obtained, introducing an anion exchange group thereto and then converting the group into an OH form.

32. The method for preparing ultrapure water according to claim 31, wherein the anion exchange resin used is a resin prepared by haloalkylating the bead-like copolymer resin obtained by suspension-polymerization and then introducing a quaternary ammonium group therein by reacting with a tertiary amine and then converting the group into an OH form with sodium hydroxide.

33. The method for preparing ultrapure water according to claim 32, wherein the haloalkylation reaction is carried out by using a haloalkylating agent selected from the group consisting of chloromethylmethylether, chloroethylmethylether, chloromethylethylether, bromomethylmethylether, bromoethylmethylether and bromomethylethylether, in the presence of a catalyst selected from the group consisting of zinc chloride, anhydrous aluminum chloride, tin chloride and iron chloride, in an organic solvent selected from the group consisting of ethylenedichloride, benzene, toluene and propylenedichloride, which swells the copolymer comprising the monovinyl aromatic compound and the polyvinyl compound.

34. The method for preparing ultrapure water according to claim 32, wherein the haloalkylation reaction is carried out by reacting the copolymer of the monovinyl aromatic compound and the polyvinyl compound with a solution of a chlorine-containing reagent selected from the group consisting of hydrochloric acid, chlorosulfuric aid, sulfuryl chloride, thionyl chloride, acyl chloride, phosphorus trichloride, phosphorus pentachloride and aluminum chloride, an alcohol and formalin or a formalin precursor selected from the group consisting of paraformaldehyde and trioxane, which forms formalin during the reaction.

35. The method for preparing ultrapure water according to claim 32, wherein the haloalkylation reaction is carried out by reacting the copolymer comprising the monovinyl aromatic compound and the polyvinyl compound with a solution comprising hydrochloric acid, methanol and formalin.

36. The method for preparing ultrapure water according to claim 32, wherein the tertiary amine is a compound selected from the group consisting of a trialkyl amine and a dialkyl-alkanol amine.

37. The method for preparing ultrapure water according to claim 36, wherein the tertiary amine is a trialkyl amine having a $C_{1-4}$ alkyl group.

38. The method for preparing ultrapure water according to claim 36, wherein the tertiary amine is a dialkyl-alkanol amine having a $C_{1-4}$ alkanol group.

39. The method for preparing ultrapure water according to claim 31, wherein the amount of the polyvinyl compound used in the suspension-polymerization is not less than 2% by weight on the basis of the total weight of the monovinyl aromatic compound and the polyvinyl compound.

40. The method for preparing ultrapure water according to claim 31, wherein the amount of the polyvinyl compound used in the suspension-polymerization is not less than 4% by weight on the basis of the total weight of the monovinyl aromatic compound and the polyvinyl compound.

41. The method for preparing ultrapure water according to claim 31, wherein the amount of the polyvinyl compound used in the suspension-polymerization is not less than 6% by weight on the basis of the total weight of the monovinyl aromatic compound and the polyvinyl compound.

42. The method for preparing ultrapure water according to claim 1, wherein the regenerated form ion exchange resin includes a regenerated form ion exchange resin which does not substantially elute an organic compound having a molecular weight of at least 2,000 when dipped in a hot water at 50° C. for 7 days.

43. The method for preparing ultrapure water according to claim 1, wherein the regenerated form ion exchange resin has an ion exchange group amount of not larger than 4.0 meq/g.

44. The method for preparing ultrapure water according to claim 1, wherein the matrix further comprises a monovinyl aliphatic compound.

45. The method for preparing ultrapure water according to claim 1, wherein said ion exchange treatment is a mixed bed ion exchange treatment.

46. The method for preparing ultrapure water according to claim 45, wherein substantially all of the ion exchange resin used is the regenerated form exchange resin.

47. The method for preparing ultrapure water according to claim 1, wherein said water to be purified is previously purified so as to have a specific resistance of at least 12MΩ cm and a total organic carbon content of not higher than 30 ppb by means selected from the group consisting of the step of passing water to be purified through the mixed bed of ion exchange resin, the step of degassing the water to be purified under reduced pressure, and the step of removing dissolved substances by passing the water to be purified through a reverse osmosis membrane resin.

48. The method for preparing ultrapure water according to claim 1, further including the steps of sterilization by irradiating with ultraviolet ray and then purification by an ultrafiltration membrane.

49. A method for preparing ultrapure water, including removing impurities including inorganic salts, organic substances, fine particles and microorganisms, comprising flowing water to be purified through a mixed bed ion exchange medium comprising a strong acidic cation exchange resin and a strong basic anion exchange resin, said mixed bed ion exchange medium further comprising, as a matrix, a bead-like copolymer resin of styrene and divinyl benzene crosslink-copolymerized in a suspension solvent, said strong basic anion exchange resin being a regenerated form strong basic anion exchange resin having a quaternary ammonium group washed with a solvent containing at least 80% of methanol and further washed with water to remove the solvent, and said strong basic anion exchange resin eluting an organic compound of a molecular weight of less than 2,000 but substantially not eluting an organic compound of a molecular weight of not less than 2,000 when dipped in a hot water at 50° C. for 7 days.

* * * * *